United States Patent [19]
Kay

[11] Patent Number: 5,665,194
[45] Date of Patent: Sep. 9, 1997

[54] IMAGE ENHANCEMENT

[75] Inventor: Ralph Kay, Basingstoke, United Kingdom

[73] Assignee: De La Rue Holographics Limited, London, United Kingdom

[21] Appl. No.: 256,273

[22] PCT Filed: Feb. 10, 1993

[86] PCT No.: PCT/GB93/00274

§ 371 Date: Jul. 6, 1994

§ 102(e) Date: Jul. 6, 1994

[87] PCT Pub. No.: WO93/15914

PCT Pub. Date: Aug. 19, 1993

[51] Int. Cl.⁶ ............................................. C09J 5/00
[52] U.S. Cl. ................ 156/325; 156/285; 156/288; 156/289; 156/321; 156/290; 156/304.6
[58] Field of Search ......................... 428/195; 156/285, 156/288, 289, 290, 291, 297, 304.6, 306.3, 321, 323, 325; 434/328, 348

[56] References Cited

U.S. PATENT DOCUMENTS 5,300,169  4/1994  Tahara .

FOREIGN PATENT DOCUMENTS

| | | |
|---|---|---|
| 0 093 009 | 11/1983 | European Pat. Off. . |
| 191592 | 8/1986 | European Pat. Off. . |
| 328086 | 8/1989 | European Pat. Off. . |
| 0407615 | 1/1991 | European Pat. Off. . |
| 0 407 615 A1 | 1/1991 | European Pat. Off. . |
| 0 497 555 A1 | 8/1992 | European Pat. Off. . |
| 497555 | 8/1992 | European Pat. Off. . |
| 1165556 | 10/1969 | United Kingdom . |
| 2181993 | 5/1987 | United Kingdom . |
| WO93/01057 | 1/1993 | WIPO . |

Primary Examiner—Merrick Dixon
Attorney, Agent, or Firm—Oliff & Berridge

[57] ABSTRACT

A method of enhancing an image (11) provided by thermoplastic marking material on a substrate (4) which material can be thermally activated to take on adhesive properties. The method comprises bringing a transfer medium (7) into contact with the substrate (4) carrying the marking material, the transfer medium including a carrier (3) and a transferable layer (15, 16), the transferable layer being positioned in use between the carrier and the substrate: thermally activating the adhesive property of the marking material; and separating the carrier (13) and substrate (4) whereby areas of the transferable layer containing the activated marking material remain on the marking material, characterized in that the transferable layer exhibits or generates a visible pattern.

21 Claims, 1 Drawing Sheet

IMAGE ENHANCEMENT

The invention relates to a method of enhancing an image provided by a thermoplastic marking material on a substrate, particularly with a view to establishing the authenticity of the substrate, which material can be activated to take on adhesive properties. Such images are commonly formed using a dry toner of the type used in electrostatic, laser printers or electrostatic photocopying machines.

Modern laser printing machines enable a wide variety of toned images to be produced. The use of heat fusible dry toner for printing is widespread. Such dry toner may be used to form the images on paper which are created by an electrostatic, laser printer controlled for example by word processing, database, spreadsheet or graphical software. The images may be in the form of letter or numerical characters, symbols, graphical compositions or pictorial compositions. For example an image in the form of a signature may be scanned into the controlling computer and held in its data set. That data set may be merged with textual data and the composite printed on an electrostatic laser printer. The signature thereby output is a facsimile formed in dry toner. Such laser printers may be employed in the manufacture of identity cards in which identification details are applied to security printed base stock, and other personalised security printed items such as passports, visas, and items such as tickets.

Office photocopiers nowadays generally employ dry toner as the imaging medium. Such xerographic reproductions are often formed with black dry toner and this photocopied printing is very difficult to distinguish from that on any laser printed original document.

Xerographic, dot image colour copiers are becoming increasingly available. These have the capability of creating realistic full colour facsimiles of the original. Full colour reproductions are created by electronically scanning and colour separating the colour components of the original document or artwork and thereafter recreating the perception of the original colours by the sequential imagewise deposition of yellow, magenta and cyan coloured heat fusible toners, with usually a final black toner tint.

Apart from office copying purposes the use of coloured toner printing is employed for lithographic print proofing purposes. Electrostatic deposition of toner may also be used in the printing stations of certain facsimile transmission machines.

High speed personalised image printing methods are also available. Here toner is deposited under electronic control on cheques and the like so as to personalise the generically printed base-stock with for example the name, address and account number details of the account holder. Thermal transfer tapes may also be employed say with mechanical, "daisy wheel" printers.

The use of dry toner form image formation is widespread. This however makes it very difficult to verify that a particular portion of any given toner print on a document is authentic, the portion being neither added to, removed or altered.

Security documents such as cheques and passports are printed with specially developed materials in special security printing processes and as such are rendered resistant to counterfeiting, alteration and substitution. Personalising images which are printed on such documents in dry toner are less resistant.

Electrostatic laser printing may be used to add personalising details or monetary values to bank cheques and to apply individualising such as personalising or numbering details to passports, tickets, and the like. There is a need to provide simple means for rendering such original images or critical portions of such personalising images secure. In particular there is a need to be able easily to render toned images readily authenticatable and to be able to distinguish an original from a photocopy. There is also a need to prevent removal, alteration or addition of toned images to documents and the like.

A fairly crude method of imparting some security to an identity card is described in GB-A-1165556. In this process, a diffraction grating structure is imparted over the surface of the identity card by over stamping. In practice, this would be prohibitively expensive to make and would not provide sufficient protection against forgery or counterfeiting.

It is already known to activate wet toned images with solvent and to apply plain transfer materials for decorative purposes.

It is also known (EP-A-0191592) to apply plain films and foils to dry toned images but these films and foils while highly decorative add very little by way of security. Of those available the metallic films are possibly the most difficult to copy but here again such metallic films would be readily available or copiable by a wrong doer.

Kroy Inc. of the USA sells such a system for decorating toned images. Thus a dry toned print on paper would be placed face-to-face with a thin film of metallised plastic. On passing these together into a heated nip, the toner is caused to be heated (by thermal conductivity) causing the toner to become tacky. Under mild roller pressure the metallic surface is pressed onto the tacky toner to which it bonds on cooling. The sheets emerge from the nip bonded imagewise together and the plastic carrier film is then peeled off.

The metallic coating which contacts the parts of the paper which do not carry toner does not bond to the paper and thus remains on the carrier film. The metal in contact with the toner is more securely bonded by the toner than to the film and the toner thus receives and retains the metallic coating and the image thereby changes its appearance.

The net effect is that the image on the photocopy is rendered metallic. A negative image is also presented on the carrier film: this is normally destroyed.

Kroy Inc sells a range of transfer films of different shades (including black, white, colours, pearlescent and metallic (gold, silver)). For example the black toner may be converted to any plain appearance such as a red, yellow, green, blue, white, gold, or silver appearance. While this is suitable for graphical decoration the materials are relatively common and so offer little protection against forgery and counterfeiting.

There is a continuing need to provide further enhancements to such images and in accordance with one aspect of the present invention, we provide a method of enhancing an image provided by a thermoplastic marking material on a substrate which material can be thermally activated to take on adhesive properties, the method comprising bringing a transfer medium into contact with the substrate carrying the marking material, the transfer medium including a carrier and a transferable layer, the transferable layer being positioned in use between the carrier and the substrate; thermally activating the adhesive property of the marking material; and separating the carrier and substrate whereby areas of the transferable layer contacting the activated marking material remain on the marking material, characterised in that the transferable layer exhibits or generates a visible pattern.

We have surprisingly found that a significant enhancement of images can be achieved in a practical and readily implementable manner by using a patterned transferable layer in contrast to the plain metallic layers already known. More surprisingly we have found that it is possible to impart optically variable properties such as by transferring holograms or foil which has been security printed and the like to dry toned images. The invention allows strong holographic patterns to be imparted to the toned shapes and also weaker holographic images, making the effect more subtle. For example, transparent holographic transfer films may be applied to toned images on a visa. The toned image at certain angles of viewing will appear normal but on tilting the holographic effect will be needed.

It should be noted in particular that the invention enables patterns to be very accurately transferred to the image only, without adhering to intermediate areas of the substrate.

Although the invention can be used to provide enhancement of the appearance of a simple image, it is particularly applicable to xerographically or laser printed heat fusible dry toned images so as to enhance the security of those images. For example, electrostatic laser printing employing dry toner is used for applying personalising identification images or value images to identity cards, visas, tickets, licences, cheques and so on. Identity cards may comprise a security printed substrate which is laser printed with an individual's details in dry toner and then sealed within a polyester pouch.

The visible pattern in the transferable layer may comprise a plain pattern e.g. a line pattern or dot pattern, a security type pattern such as a guilloche and the like, generally comprising a security printing ink, or preferably an optically variable pattern originating from diffraction, interference or polarisation of white light such as an holographic pattern. By holographic we mean the image will result from light diffraction for example at a diffractively embossed surface. Optically polarising materials include liquid crystal polymeric materials which would be held on a carrier via a (wax) release layer.

A diffracting pattern may be that of a plain generic diffraction grating, a mosaic of abutting diffraction gratings, a two dimensional graphical pattern or a multiple two dimensional pattern thereby giving the impression of planes of depth, or an hologram of an object exhibiting continuous three dimensional depth, a stereohologram, or a multiplexed hologram. The diffracting foil may be transparent or opaque.

The diffracting image may be formed by computer generated diffractive pattern writing methods such as are created by electron beam writing methods e.g. the Kinegram, pixellated diffractive images disclosed in WO 91/03747, and pixellated diffractive gratings as disclosed by WO-A-90/07133.

The invention will principally be described with reference to transferable holographic layers to dry toned images.

Examples of the holographic transfer media include:

a) Carrier (e.g. polyester):
  wax release layer (or bonding control layer):
  embossable lacquer (e.g. acrylic):
  holographically embossed surface:
  optional printing or additional transparent layer:
  metallic layer such as aluminium or a layer of substantially different refractive index to the lacquer or polymer on which it sits such as zinc sulphide, titanium oxide, zirconium oxide:

b) Carrier (e.g. polyester, polypropylene):
  releasable embossable lacquer (e.g. polyvinylidene chloride/polyvinylidene fluoride or an acrylic/vinyl copolymer):
  embossed surface:
  optional printing or additional transparent polymeric layer:
  metallic layer such as aluminium or a layer of substantially different refractive index to the lacquer or polymer on which it sits such as zinc sulphide, titanium oxide, zirconium oxide:
  optional printing or additional transparent polymeric film: and c) Carrier (e.g. polypropylene optionally corona treated) having
  releasable embossed surface:
  optional releasable printing:
  metallic layer such as aluminium or a layer of substantially different refractive index to the lacquer or polymer on which it sits such as zinc sulphide, titanium oxide, zirconium oxide.

The underside of any diffractively embossed or cast transparent polymeric surface may be treated with a metallic film which will normally be continuous and opaque but may be partial either as a very thin film or as dots (e.g. as described in EP-A-328086), or coated with a material of different refractive index to make the hologram somewhat transparent such as zinc sulphide, titanium oxide or zirconium oxide layers. Examples of coatings for transparent holograms are given in EP 201323A. In these cases the metallic layer may be exposed to the environment and so an additional, transparent layer may be provided to protect the metallic layer. This protective layer may be fluorescent.

Thus the diffracting surface may be treated with a layer of vapour or electron beam deposited metal such as aluminium, gold, silver, chromium, copper, nickel, titanium, zinc, magnesium or the like.

Alternatively in order to make an interference structure the carrier may be treated with alternating thin layers of a dielectric material such as zinc sulphide. For example such cohesive multiple layer coatings are made by sequentially depositing a number of metallic and dielectric layers or alternating layers of two or more dielectric materials at thickness such that they interfere with incoming white or other visible light. These layers constitute the light interfering structure and may be formed on a releasable carrier which on transfer in accordance with the invention cause a white light interfering optically variable appearance to be given to the toned print.

There may be included machine readable features within any holographic pattern. The hologram may be printed at the embossed interface before application of the metallic or other layer. If a transparent hologram is made the printing may be above or below the refracting holographic layer.

It will be appreciated that following performance of the method, the new appearance of the imagewise deposited marking composition on the substrate will be such that the secondary image from the transfer medium will be superimposed upon the first image. In particular, where the transferred image exhibits miniature repeated symbols or characters which extend over a number of portions of the underlying image, a significant enhancement of security is achieved since the detection of any altered portions becomes much easier. Similarly gradual diffractive colour changes arising from grating structures or gradual colour changes resulting from interference of light may also be used to engender visual continuity from one toned character to the next. The holographically modified toned image then becomes resistant to photocopying including colour copying. As the patterned materials which we employ will be restricted in supply and difficult to manufacture, counterfeiting will be suppressed. Similarly it will be difficult for wrong-doers to add, alter or substitute additional characters.

Preferably the secondary pattern extends over the entirety of individual image shapes (as distinct from the pixels or dots which combine to form all or part of an image element such as a letter of the alphabet).

By providing a complete patterned protective coating, counterfeiting is substantially inhibited because of the difficulty of recreating the effect precisely. The supply of the patterned material will also be restricted in availability and a forger's attempt at alteration is more likely to be detected.

Counterfeiting and forgery will be especially deterred if any optically variable transfer films are used such as holographic films. The difficulty of recreating holograms and the like is considerable.

A further advantage of the invention is that it offers a very simple way of "printing" holograms, interference structures and security patterns. Thus serial numbers on brand protection labels may readily be "printed" with holographic characters by printing with dry toner and then effecting transfer.

The transfer medium may be provided in sheet form or ribbon form. For example it may be necessary only to verify one part of the (toned) information image such as a printed financial value. In this case a film with local transfer characteristics may be used or alternatively there may be provided a tab of transfer material which is releasably attached by adhesive to the document at one edge of the carrier film.

The pattern on the transfer medium will generally be a fine pattern (relative to the size of the area of the image). For example it is preferable that each separate character (but not necessarily each pixel) comprising a word or large number be patterned. Thus if a number comprising several digits is printed with toner, each digit could be given a holographic or similar appearance within its perimeter and there preferably will be a recognisable continuity of the (secondary) holographic pattern across the digits or systematic colour shift.

The invention thus provides a surprisingly simple, convenient but secure method of protecting laser printed images. We believe that it is particularly remarkable that the fineness of holographic detail is not lost during the heated transfer process as had been expected. It appears that the toner forms an even bed for the material.

Suitable images may be formed using heat fusible dry toner and similar thermally activatable electrostatically deposited powders, heat softenable imaging films such as electronic typewriter transfer films and thermal printer transfer films and heat softenable inks including printing inks such as screen printing, intaglio lithographic and letterpress inks, and marker pen inks. Such holographic transfer acceptor layers must be of sufficient area and exhibit sufficient flow deformation and tack on heating to the transfer temperature, otherwise transfer will not be satisfactory in quality.

It is possible that other forms of electronically created images could be employed on the transfer medium such as thermal transfer tapes, transferable typewriter films, thermographic images, and even softenable printing inks e.g. screen printed, electrostatically deposited powders.

Any printing on the transferable layer will typically be presented as a pattern of fine line work indicia as typically used in the security printing industry. The printing may also provide images such as alphanumeric patterns, bar codes, symbols, logos, graphical designs, geometric figures, vector generated ray and line patterns and the like. These printed images should cover the transferable portions such that in use the marking material will be adequately patterned.

The printing could be formed as a printed pattern created by printing releasable inks which are black, white, coloured, metallic, coloured metallic, pearlescent, iridescent, or toner and the like such as onto the carrier film. The transfer material may be patterned by printing onto the carrier before the bulk of the transfer film is applied with a carrier-releasable ink. Such patterning ink if not on that surface may be placed inside the transfer medium or on the furthest surface of the medium assuming that the medium is wholly or partly transparent.

Ink pairs may also be blended in the foreground image or the background coating to form a "rainbow" colour variation as known in the security printing industry. Pairs of metameric inks may also be employed.

The inks may have special (security) properties such as ultraviolet or visible or near infrared inducible fluorescence or phosphorescence, photochromism, thermochromism, or magnetic properties.

When the transferable layer carries printing it will generally be a releasable film forming layer which may be opaque, translucent or transparent, and colourless or coloured, or it may be metallic.

The carrier is then subsequently treated by coating or other film deposition methods to form the transferrable layer structure. If the transferrable layer is transparent the printing may be located inside or on the outer surface.

The marking material will generally be activated by raising its temperature, typically as the transfer medium is brought into contact with the image. However, the activation could occur before or after contact. For heat tackifying printing inks and dry toner, under conditions of elevated temperature the marking material but not its substrate will become tacky and bond locally to the transfer bonding surface of the transfer medium. Following this contact step, the transfer medium is separated from the substrate, if necessary after cooling.

Thus, in order to effect transfer the substrate carrying the heat activatable image and the transfer layer must be brought into contact. Sufficient heat and pressure must be applied such that the imaging medium adheres to the transfer coating. The transfer temperature should be chosen so that neither the substrate, the carrier film nor the transfer layer itself are rendered tacky or deteriorate.

When the carrier is peeled away only the portion of the transfer layer in contact with the heat activatable image is transferred.

In the case of dry toner and where the transfer medium includes a film forming e.g. lacquer coating, the temperature at which the toner becomes tacky should be significantly lower than the glass transition temperature of the lacquer which holds the embossed pattern as otherwise premature softening may occur with loss of the transfer pattern.

Transfer may be effected by the use of a heated platen which may have a flat or patterned surface. Alternatively transfer may be effected by the use of heated rollers such as in a rotary laminating apparatus: the rollers may be plain or possibly patterned. The rollers may be incorporated into a copying machine such as a dry toned copying machine, or a laser printer which forms printing in dry toner. The roller need not cover the full width of the substrate for example it may cover a band.

Apart from using heated rollers for heating by conduction, it may be possible to use radiant heat, such as from an infrared strip lamp to heat the layers while both materials are held in face to face contact, or by dielectric induction, radio frequency, etc., for specific application.

Again, in the case of an image defined by toner, the characteristics of the transfer medium and toner are important and may be determined for a particular application by experiment. The toner should not exhibit tack under normal ambient conditions, yet become tacky on heating. The surface of the substrate must be sufficiently strong to bond the toner and the toner must be strong enough to bond to the transfer film. Clearly the respective adhesive bonds and cohesive strengths must be sufficient for the transfer to occur cleanly. The quantity of toner present on the substrate may also affect the transferred image quality.

It is possible to undertake the transfer within a continuous printer such as a laser printer which has an output station causing the affixing of transferrable holograms to all or part of the print or copy.

In addition to transferring the (holographic) patterns to positively printed characters it may be used to transfer "negative" surrounds to characters if toner comprises the surround.

The manufacture of a transferrable foil useful for the invention must take into account relative cohesions and adhesions which are necessary to allow the foil to be successfully used. Thus for example too readily releasable characteristics on the foil and the use of too soft an embossing lacquer might lead to premature release.

When in Example c) lacquer free metal which holds a diffracting pattern is to be transferred it should be appreciated that the toner surface will already be in a fused state and thus relatively smooth. Contact of the toner and the metal will occur under pressure when the toner is in its molten state and this will surprisingly enable the holographic image to be retained, not lost as might be anticipated. This offers a low cost method of transferring holographic images as the metallic layer alone is transferred. Durability of the structure will however be less than if the metal is protected by a polymeric layer.

The substrates carrying a toned or other suitable image for the working of this invention include cellulosic paper, rag paper, surfaced finished papers including baryta surfaced papers, resin coated papers, synthetic papers including non-woven and spun bonded papers, lacquer coated papers, plastic films, metallised plastic films, plastic laminated films, plastic-paper laminates, metallic foils, and metallic sheets.

Examples of items bearing toner or other types of soft-enable printing suitable for working the invention include visas, passports, licences, cheques, identity cards, plastic cards, bank notes, tickets, bonds, share certificates, vouchers, passes, permits, electrostatic photocopies, electrostatic laser printed materials, brand authentication labels, serial numbering slips, quality control certificates, bills of lading and other shipping documentation, legal documents and tamper evident labels.

A protective lacquer may be provided for example by printing, over the enhanced image, this optionally extending to the areas which are not covered by the enhanced image.

The method may be adapted to protect signatures and graphical patterns if such are presented in real or facsimile form with a softenable image such as toner or heat activatable ink.

The transfer layer will normally be continuous and completely cover the carrier. It may however be possible to print patterns of embossable lacquer and then holographically emboss and then metallise these (such as by a metal plating method) so as to provide a patterned transfer film.

In summary, the present invention allows toned and similar images to be given a new visual appearance but without changing the information content conveyed by any printed letter or numerical characters. Surprisingly we have found that the fineness of diffractive embossing is not destroyed during heat transfer of for example a foil exhibiting an holographic appearance.

Thus if the numbers "1" to "5" were printed in black toner in the form of say a serial number, by applying a holographic transfer foil, the digits would be seen to take on an holographic appearance. This holographic appearance would be difficult to counterfeit or alter. Indeed apart from the holographic pattern which may be diffractive colouration and which may be viewed within the toner defined area which defines any one digit, the holographic pattern may be seen to continue across the adjacent digits. Thus by providing a pattern within one digit and a pattern in an adjacent digit and having graphical correlation between the two patterns, the counterfeiter and forger's task is made more difficult.

Not only is the holographic image difficult to photocopy but alteration, removal or addition of one digit within a series of pattern correlated digits can be readily spotted. This is likely to be of considerable value for the securing of original images in value documents in which the amount is depicted in toner, such as legal documents, cheques and the like. The method also allows continuous production capability in that the holographic transfer foil or the like may be presented in reel form and located at the output end of a printer such as a laser printer which prints in dry toner, or a dry toned black or coloured copying machine or a cheque personalisation printer or such that transfer to the dry toned images may occur before the net printing operation is complete.

The pattern which may be used to correlate one character with another or one pattern of an image with another may comprise a large scale pictorial image or for example a generic pattern comprising repeated text or symbols in miniature or optically variable colour shifts.

While holographic materials are likely to be very useful, the security of adjacent digits may be significantly enhanced by using a metallic film which supports fine line security indicia which extends from one character to the next.

In addition to providing heightened security the invention also provides a novel method of decorating toned and the like images. The transferred shapes follow the original design or variable data and these can readily be changed unlike the dies used in hot stamping methods.

In accordance with a second aspect of the present invention, a method of enhancing an image provided by a marking material on a substrate comprises contacting the substrate and marking material with a patterned mould under conditions of elevated temperature and pressure at which the marking material is thermoplastic and mouldable but the substrate is not; and, after the marking material has taken up the mould pattern, removing the mould.

As a further aspect of the invention it has surprisingly been found that it is possible to impart a diffractive (e.g. holographic surface effect) to a dry toned image formed in an electrostatic laser printer or dry toned copying machine by contacting the toner under conditions of elevated temperature and pressure with a diffractively patterned mould, causing the toner to conform with the mould and then separating the mould from the toner. The cooled toned image is generally smoothed by the mould, approaching a film forming state and the smooth surface retains the diffractive microstructure imparted by the mould.

In this way it has proved possible diffractively to decorate toned images in a subtle but readily visually detectable manner without the need to effect transfer of a holographic transfer material.

If black toner is used the toned image takes on a glossy appearance which on inspection can be seen to be diffractively enhanced.

By using a diffractive mould which spans several toned characters each character can be given a subtle diffractive appearance. If the diffractive pattern is chosen to vary across the span of these characters than the controlled variation of the diffractive image pattern can be seen to extend on a continuous manner from character to character. Thus any alterations, deletions or additions are likely to be noticed when the item is inspected for authentication.

The imparting of the diffractive pattern to the toner may be achieved by using a metallic plate, the surface of which holds the diffracting microstructure. This is commonly called an "holographic shim". Alternatively the microstructure may be presented moulded into a plastic. The plastic will however need to have a glass transition temperature significantly above that of the temperature at which the toner softens and can be moulded.

Thus polypropylene or polyester film which has been holographically embossed may be employed as the mould. Here typically a toned print would be placed against the face of the mould and the two surfaces held together under conditions of elevated temperature and pressure. On partial cooling the paper would be stripped away from the mould and the surface of the toner would have diffractive subtle, visible security feature which is not readily noticeable on casual inspection of a document but nevertheless visually verifiable.

At other angles the toner will appear to be relatively normal, e.g. black which may assist the readability of any documents so treated. The diffracting images will be typically of the types mentioned previously.

The shim may be employed as a planar stamp or on a cylinder suitable for rotary embossing. Certain substrates may be compressible such as paper and the final diffractive image quality may depend on the evenness of compressibility achievable relative to the fine microstructure which has to be imparted and the overall smoothness of the substrate.

In one embodiment there is a printed image formed by a dry toner in which the surface of the toner is light diffracting.

An example of a method and apparatus according to the invention will now be described with reference to the accompanying drawings, in which.

Figure 1:
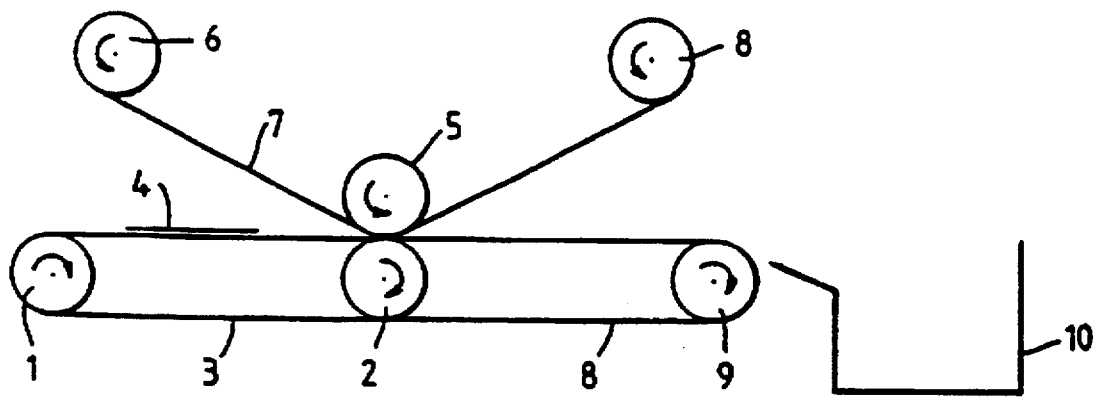
FIG. 1 is a schematic view of the apparatus.

The apparatus shown in FIG. 1 may be part of an electrostatic printing or photocopying machine and comprises a pair of rollers 1,2 about which is entrained a conveyer belt 3. The conveyer belt 3 receives sheets 4 following printing by dry toner (not shown) and carries these sheets to a nip between the roller 2 and a roller 5 which is heated (by means not shown). A transfer medium 7 held on a storage roll 6 is fed through the nip between the rollers 2,5 and then to a take up roller 8. Sheets which pass through the nip are conveyed on a belt 8' entrained about a roller (not shown) co-axial with the roller 2 and a roller 9 to a receiving hopper 10.

Figure 2:
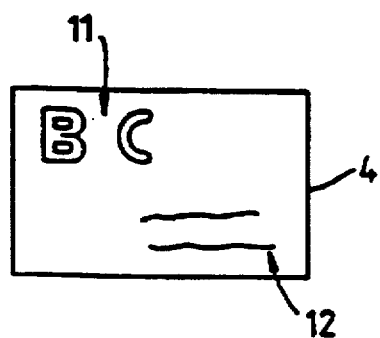
FIGS. 2 and 3 illustrate a sheet before and after processing by the apparatus; and, FIG. 4 is an enlarged cross-section through the transfer medium shown in FIG. 1 (not to scale).

FIG. 2 illustrates an example of a sheet 4 as it is conveyed by the conveyer 3. The sheet 4 carries a dry toned image 11 constituting the letters "B" and "C" as well as other printed information 12 (not printed by dry toner).

Figure 4:
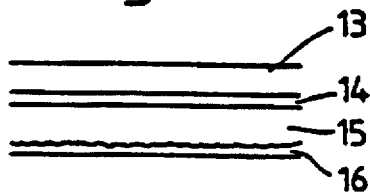

FIG. 4 illustrates a typical form for the transfer medium 7. The transfer medium comprises a polyester carrier 13, a wax release layer 14, and an holographically embossed laquer layer 15. The embossing is coated with a metallic layer such as aluminium 16.

Figure 3:
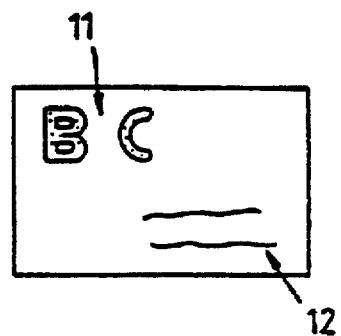

As the sheet 4 enters into the nip between the rollers 2,5, the sheet is heated and the dry toner will become tacky under the heat treatment. The tacky dry toner acts as an adhesive so that where it contacts the transfer medium 7, correspondingly shaped parts of the transfer medium will detach from the carrier 13 and release layer 14 thus transferring layers 15,16 onto the shaped areas of the letters "B", "C". The appearance of the sheet following this transfer operation is shown schematically in FIG. 3 where it will be seen that the letters "B" and "C" carry the holographic image but no other areas of sheet (including the printed area 12) carries that image. The holographic image may be seen to be in register between transferred portions "B" and "C".

Combinations of the above transfer foils may be used to impart different effects in different parts of a document.

Normally the carrier with remaining untransferred medium will be discarded but for certain applications it may be retained for example to function as a receipt carrying the complementary image.

I claim:

1. A method of enhancing an image provided by a thermoplastic marking material on a substrate which material can be thermally activated to take on adhesive properties, the method comprising selecting a transferable layer from a group of transferable layers including a visible pattern exhibiting transferable layer and a visible pattern generating transfer layer wherein at least a portion of the pattern repeats; bringing a transfer medium into contact with the substrate carrying the marking material, the transfer medium including a carrier and said selected transferable layer, the selected transferable layer being positioned in use between the carrier and the substrate; thermally activating the adhesive property of the marking material; and separating the carrier and substrate whereby areas of the selected transferable layer contacting the activated marking material remain on the marking material.

2. A method according to claim 1, wherein the marking material represents a security image.

3. A method according to claim 2, wherein the substrate comprises a security document, the marking material defining a personalised image characteristic of the holder.

4. A method according to claim 2, wherein the substrate defines a security document selected from a group including visas, passports, licenses, cheques, identity cards, plastic cards, bank notes, tickets, bonds, share certificates, vouchers, passes, permits, electrostatic photocopies, electrostatic laser printed materials, brand authentication labels, serial numbering slips, quality control certificates, bills of lading and other shipping documentation, legal documents and tamper evident labels.

5. A method according to claim 1, wherein the visible pattern is an optically variable pattern.

6. A method according to claim 5, wherein the optically variable pattern is an holographic pattern.

7. A method according to claim 6, wherein the holographic pattern is selected from the group including a plain generic diffraction grating, a mosaic of abutting diffraction gratings, a two dimensional graphical pattern or a multiple two dimensional pattern, an hologram of an object exhibiting continuous three dimensional depth, a stereohologram, or a multiplexed hologram.

8. A method according to claim 1, wherein the transferable layer comprises an embossed surface coated, at least partially, with a metallic film.

9. A method according to claim 1, wherein the transferred pattern that repeats extends over a number of portions of the underlying image defined by the marking material.

10. A method according to claim 9, wherein at least another portion of the visible pattern does not repeat, over the entirety of the image defined by the marking material.

11. A method according to claim 1, wherein the image defined by the marking material comprises at least one of fine line work indicia, alphanumeric patterns, bar codes, symbols, logos, graphical designs, geometric figures, vector generated ray and line patterns and the like.

12. A method according to claim 1, wherein the marking material comprises one of a printing ink and dry toner.

13. A method according to claim 1, wherein the adhesive property of the marking material is activated while the transfer medium contacts the substrate.

14. A method according to claim 1, wherein the substrate is selected from the group including paper, rag paper, surfaced finished papers including baryta surfaced papers, resin coated papers, synthetic papers including non-woven and spun bonded papers, lacquer coated papers, plastic films, metallised plastic films, plastic laminated films, plastic-paper laminates, metallic foils, and metallic sheets.

15. A document carrying an image provided by a thermoplastic marking material on a substrate, which material can have adhesive properties when subjected to heat, the image having been enhanced by a method according to claim 1.

16. A document according to claim 15, wherein a toner image has been provided by one of laser printing and xerographic copying.

17. A document according to claim 15, wherein the visible pattern is an optically variable pattern, and wherein the transferrable layer of the transfer medium used to enhance the image included the optically variable pattern.

18. A document according to claim 15, wherein the image is a security image.

19. A method of enhancing an image provided by a marking material on a substrate the method comprising contacting the substrate and marking material with a patterned mould under conditions of elevated temperature and pressure at which the marking material is thermoplastic and mouldable but the substrate is not; and, after the marking material has taken up the mould pattern, removing the mould.

20. A method according to claim 19, wherein the marking material defines a dry toned image.

21. A method according to claim 19, wherein the mould defines a diffractive pattern.

* * * * *